(12) United States Patent
Koshina et al.

(10) Patent No.: US 7,645,539 B2
(45) Date of Patent: Jan. 12, 2010

(54) NON-AQUEOUS ELECTROLYTE SECONDARY BATTERY

(75) Inventors: Hizuru Koshina, Neyagawa (JP); Shinji Nakanishi, Hirakata (JP)

(73) Assignee: Panasonic Corporation, Osaka (JP)

( * ) Notice: Subject to any disclaimer, the term of this patent is extended or adjusted under 35 U.S.C. 154(b) by 348 days.

(21) Appl. No.: 11/397,562

(22) Filed: Apr. 5, 2006

(65) Prior Publication Data

US 2007/0238014 A1    Oct. 11, 2007

(51) Int. Cl.
H01M 4/36 (2006.01)
H01M 4/58 (2006.01)
H01M 6/16 (2006.01)

(52) U.S. Cl. .......... 429/105; 429/218.1; 429/231.1; 429/231.9; 429/326; 429/330; 429/340

(58) Field of Classification Search .......... 429/105, 429/231.95, 231.8, 231.1, 330, 340, 326, 429/218.1, 231.9
See application file for complete search history.

(56) References Cited

U.S. PATENT DOCUMENTS 4,278,741 A * 7/1981 Kalnoki-kis .......... 429/48
4,431,719 A * 2/1984 Urry .......... 429/105
5,800,941 A * 9/1998 Elster et al. .......... 429/105
2002/0106561 A1   8/2002 Lee et al.

FOREIGN PATENT DOCUMENTS

JP    61-263069    * 11/1986
JP    2002-203542    7/2002

OTHER PUBLICATIONS

Matsunaga et al., "Behavior of Na/Se(IV) secondary battery utilizing $AlCl_3$—NaCl molten salt", Denki Kagaku, 1983, vol. 51, No. 10, pp. 847-848.
Japanese Office Action issued in Japanese Patent Application No. JP 2003-325990 dated May 21, 2009.

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

A non-aqueous electrolyte secondary battery includes: a liquid electrolyte including a non-aqueous solvent and an alkali metal salt dissolved in the non-aqueous solvent; a positive electrode active material including a redox material that is dissolved or dispersed in the liquid electrolyte; a positive electrode current collector that provides a place where an oxidation-reduction reaction involving the positive electrode active material occurs; and a negative electrode capable of charging and discharging in which an alkali metal ion participates.

16 Claims, 1 Drawing Sheet

NON-AQUEOUS ELECTROLYTE SECONDARY BATTERY

FIELD OF THE INVENTION

The present invention relates to a non-aqueous electrolyte secondary battery, and particularly, to an improvement in the energy density of the non-aqueous electrolyte secondary battery.

BACKGROUND OF THE INVENTION

Recently, electronic devices have been rapidly becoming smaller, lighter, and cordless. This tendency is remarkable in information electronic appliances, such as personal computers, cellular phones, and PDAs, and audio-visual electronic appliances, such as video camcorders and mini-disc players.

Batteries, especially secondary batteries with high energy density are desired as power sources for such electronics devices. Among them, non-aqueous electrolyte secondary batteries provide high energy densities incomparable to those of lead-acid batteries, nickel-cadmium storage batteries and nickel-metal hydride storage batteries. Thus, non-aqueous electrolyte secondary batteries are becoming dominant as a power source for such electronic devices.

Non-aqueous electrolyte secondary batteries (e.g., lithium ion secondary batteries and lithium ion polymer secondary batteries) include a positive electrode active material that provides an average discharge potential of 3.5 V to 4.0 V relative to lithium. Exemplary positive electrode active materials include lithium cobaltate ($LiCoO_2$), lithium nickelate ($LiNiO_2$), lithium manganate ($LiMn_2O_4$), mixtures thereof, and solid solution materials containing a plurality of transition metals (e.g., $LiCo_xNi_yMn_zO_2$, $Li(Co_aNi_bMn_c)_2O_4$).

Such a positive electrode active material is mixed with a conductive agent and a binder, to form a positive electrode mixture. The positive electrode mixture is applied to a current collector or a case serving as a current collector. Alternatively, the mixture is compression-molded into a predetermined shape. The current collector or case serving as the current collector is composed of aluminum, titanium or stainless steel.

As a negative electrode active material, carbon material capable of absorbing and desorbing lithium is preferably used. Exemplary carbon materials include artificial graphite, natural graphite, heat-treated mesophase material made from coal or petroleum pitch, and amorphous carbon.

Such a negative electrode active material is mixed with a binder and the like, to form a negative electrode mixture. The negative electrode mixture is applied to a current collector or a case or a cap serving as a current collector. Alternatively, the mixture is compression-molded into a predetermined shape and then fixed into the case or the cap composed of iron or nickel preferably. The current collector is preferably composed of copper foil.

When a graphite material is used as the negative electrode active material, the average potential at which lithium ions are released is approximately 0.2 V lower than that when an amorphous carbon is used. Thus, a graphite material is suitable as the negative electrode active material in case high voltage and voltage plateau flatness are desired.

A non-aqueous electrolyte is selected so as to resist the oxidizing atmosphere of the positive electrode that discharges at such high potentials as described above and the reducing atmosphere of the negative electrode that charges and discharges at potentials close to that of lithium. A currently used non-aqueous electrolyte is composed of a solvent mixture of ethylene carbonate (EC) with a high dielectric constant and a chain carbonate (acyclic carbonate) with a low viscosity, and lithium hexafluorophosphate ($LiPF_6$) dissolved therein. As the chain carbonate, for example, one or more of diethyl carbonate (DEC), dimethyl carbonate (DMC), and ethyl methyl carbonate (EMC) are used. Cyclic carbonates and cyclic esters with high dielectric constants, such as propylene carbonate and γ-butyrolactone, are also used. As the low-viscosity solvent, for example, fluorobenzene is used.

Lithium ion polymer secondary batteries employ a gel polymer as an electrolyte. The gel electrolyte comprises, for example, the above-described non-aqueous electrolyte as a plasticizer retained in a polymer component.

In order to improve the high temperature storage characteristics and cycle life characteristics of non-aqueous electrolyte secondary batteries, it has been proposed to add vinylene carbonate, propanesultone, phenyl ethylene carbonate, vinyl ethylene carbonate, or the like to the non-aqueous electrolyte. Also, in order to enhance the safety during overcharge, it has been proposed to add the following materials in some cases, for example, cyclohexyl benzene, biphenyl benzene, or diphenyl ether to the non-aqueous electrolyte.

The capacity of a non-aqueous electrolyte secondary battery is limited by the maximum capacity density of a positive electrode (approximately 282 mAh/g for $LiCoO_2$) and the maximum capacity density of a negative electrode (approximately 372 mAh/g for graphite). Therefore, standardized batteries whose volumes are limited cannot provide so much improvement in energy density as long as they utilize conventional materials or materials similar to conventional ones.

Under such conditions, a secondary battery with a new structure is being studied which utilizes sodium in a negative electrode, a molten salt in a positive electrode, and a sodium-ion-conductive solid electrolyte in a separating film (Matsunaga, entitled "Behavior of Na/Se(IV) secondary battery utilizing $AlCl_3$—NaCl molten salt", DENKI KAGAKU, 1983, Vol. 51, No. 10, p. 847-848).

BRIEF SUMMARY OF THE INVENTION

An object of the present invention is to provide a non-aqueous electrolyte secondary battery that is inexpensive and has a high energy density, compared with conventional ones.

The present invention relates to a non-aqueous electrolyte secondary battery including: a liquid electrolyte comprising a non-aqueous solvent and an alkali metal salt dissolved in the non-aqueous solvent; a positive electrode active material comprising a redox material that is dissolved or dispersed in the liquid electrolyte; a positive electrode current collector that provides a place where an oxidation-reduction reaction involving the positive electrode active material occurs; and a negative electrode capable of charging and discharging in which an alkali metal ion participates.

The negative electrode is capable of absorbing and desorbing an alkali metal ion. Alternatively, an alkali metal can be deposited on or dissolved from the negative electrode.

During battery operation, the negative electrode is electronically insulated from the positive electrode active material. However, even during battery operation, as long as the amount of self-discharge is permissible, the negative electrode may be electronically continuous to the positive electrode active material and does not need to be completely electronically insulated therefrom.

The negative electrode may be covered with a separating film, and the separating film may be, for example, a film that has alkali-metal-ion conductivity and shields the negative electrode from the positive electrode active material.

It is preferred that the separating film be permeable only to the alkali metal ion.

Preferably, the liquid electrolyte and the positive electrode active material form a liquid or fluid composite or mixture.

A part of the positive electrode active material may be integrated with the positive electrode current collector.

The positive electrode current collector preferably comprises a metal sheet and/or a porous carbon sheet, and the metal sheet preferably has a dissolving (oxidation) potential of +3 V or higher relative to a potential of an alkali metal that forms the alkali metal salt.

The metal sheet preferably has a carbon layer attached to a surface thereof.

A negative electrode lead that is connected to the negative electrode for leading a current to outside is preferably shielded from the positive electrode active material.

A part or the whole of the positive electrode active material is desirably capable of being dissolved in the non-aqueous solvent. The positive electrode active material preferably comprises at least one redox material selected from the group consisting of a transition metal salt, a sulfur compound, a selenium compound, a tellurium compound, sulfur (a substance composed simply of sulfur), selenium (a substance composed simply of selenium), and tellurium (a substance composed simply of tellurium).

The negative electrode preferably comprises at least one selected from the group consisting of an alkali metal, graphite, amorphous carbon, fullerene, carbon nanotube, an alloy, a transition metal oxide, a transition metal sulfide, silicon, and silicon monoxide.

The alkali metal salt preferably comprises at least one selected from the group consisting of an imide salt, a methide salt, a borate, a perchlorate, a hexafluoroarsenate, a chloroaluminate, a thiocyanate, an iodide salt, a tetrafluoroborate, a hexafluorophosphate, a modified hexafluorophosphate, and a modified tetrafluoroborate. As used herein, the modified hexafluorophosphate is a salt in which at least one of the fluorine atoms bonded to the phosphorus atom is replaced with $-CF_3$ or $-C_2F_5$, and the modified tetrafluoroborate is a salt in which at least one of the fluorine atoms bonded to the boron atom is replaced with $-CF_3$ or $-C_2F_5$.

The non-aqueous solvent preferably comprises at least one selected from the group consisting of a polar solvent that is in liquid form at room temperature and a molten salt that is ionized at room temperature.

The separating film preferably comprises an alkali-metal-ion conductive solid electrolyte.

The alkali-metal-ion conductive solid electrolyte preferably comprises an alkali metal phosphate.

It is preferred that the alkali-metal-ion conductive solid electrolyte further comprise a sulfide salt.

The liquid electrolyte preferably comprises an organic substance that has the function of forming a coating film on the surface of the negative electrode upon charge or discharge.

The organic substance preferably comprises at least one selected from the group consisting of vinylene carbonate, vinyl ethylene carbonate, phenyl ethylene carbonate, and propanesultone.

When the liquid electrolyte contains the above-mentioned organic substance, an alkali-metal-ion conductive coating film is formed on the negative electrode surface upon charge in an early stage. Thus, the negative electrode does not need to be electronically insulated from the positive electrode active material immediately after the battery is produced.

The present invention can provide a non-aqueous electrolyte secondary battery that is inexpensive and has a high energy density, compared with conventional ones.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
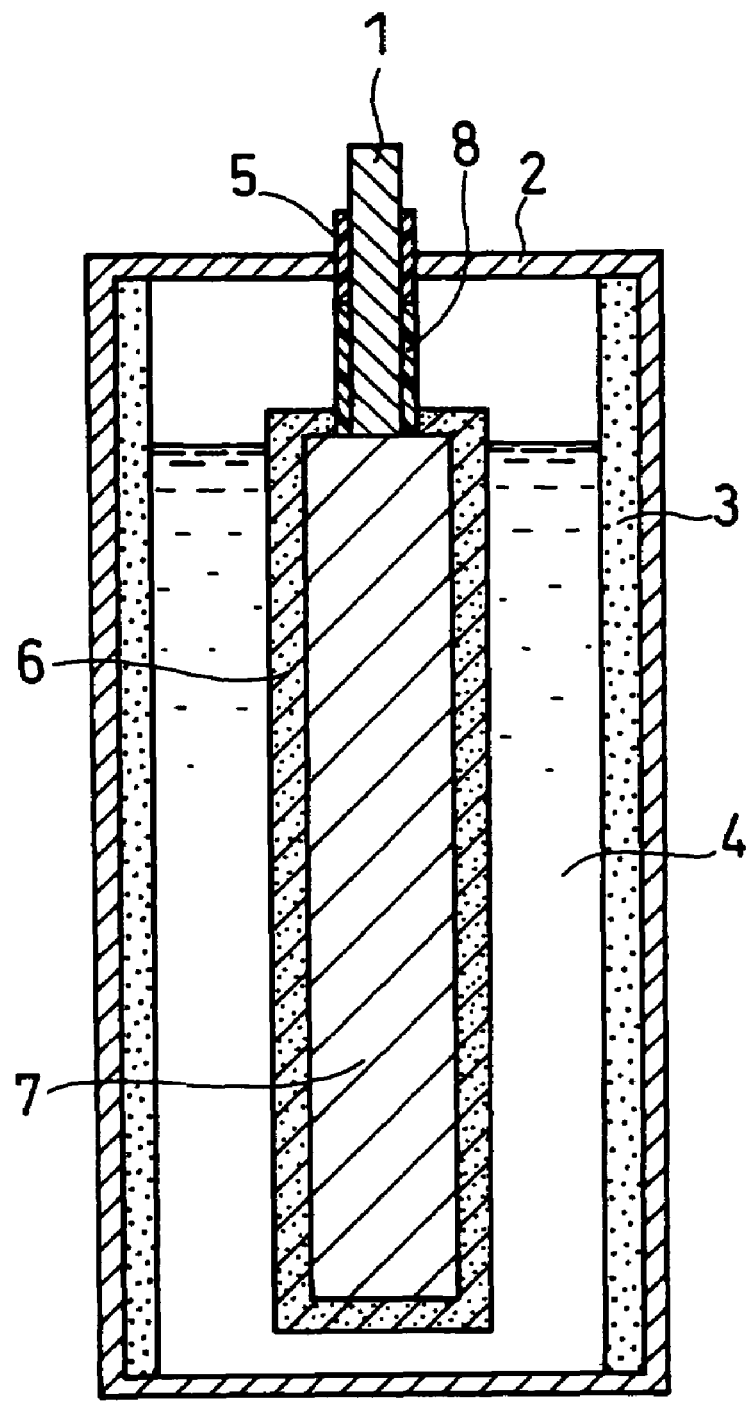
FIG. 1 is a longitudinal sectional view of an exemplary non-aqueous electrolyte secondary battery.

A non-aqueous electrolyte secondary battery of the present invention includes components (A) to (D). The component (A) is a liquid electrolyte comprising a non-aqueous solvent and an alkali metal salt dissolved in the non-aqueous solvent. The component (B) is a positive electrode active material comprising a redox material that is dissolved or dispersed in the liquid electrolyte. The component (C) is a positive electrode current collector that provides a place where an oxidation-reduction reaction involving the positive electrode active material occurs. The component (D) is a negative electrode capable of charging and discharging in which an alkali metal ion participates.

The component (A) and the component (B) normally form a liquid or fluid composite or mixture (hereinafter referred to as a positive electrode liquid).

The positive electrode liquid contains a non-aqueous solvent, an alkali metal ion, and a redox material as essential components.

The redox material, such as a chalcogen material (e.g., sulfur, selenium, or tellurium) or a transition metal salt, is dissolved or dispersed in the positive electrode liquid, and the redox material functions as the positive electrode active material. The alkali metal salt of the component (A) has the function of maintaining the electrochemical neutrality of the positive electrode liquid. The alkali metal salt also has the function of stabilizing the oxidized or reduced state of the redox material by coordination.

A chalcogen element, which is a redox material, is capable of forming an alkali metal salt. The alkali metal salt of the chalcogen element is ionized to an alkali metal ion and a chalcogen ion. At this time, the chalcogen element is negatively charged, but it is converted to a highly oxidized state by charge.

The following reaction formula (1) shows an exemplary reaction that takes place when the alkali metal ion is a lithium ion and the chalcogen element is sulfur.

Reaction formula (1)

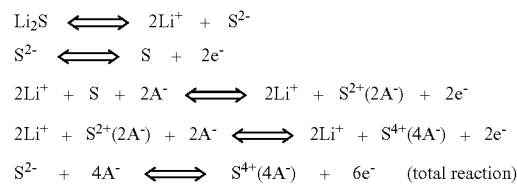

In the formula, LiA represents the lithium salt that forms the component (A) and is dissolved in a non-aqueous solvent. LiA is ionized as follows:

As shown above, when lithium sulfide is utilized, the total reaction is maximum 6-electron reaction. Alkali metal salts of the other chalcogen elements than sulfur can also be used as redox materials in the same manner.

A transition metal salt, which is a redox material, is ionizable to a positively charged transition metal ion (cation) and an anion. The transition metal ion cannot cause a reaction involving such a large number of electrons as the chalcogen elements, but it can provide variations to battery voltage depending on the kind of the transition metal.

The following reaction formula (2) represents an exemplary reaction that takes place when the transition metal ion is a Co ion. Therein, LiA also represents the lithium salt forming the component (A).

Reaction formula (2)

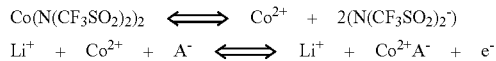

$Co(N(CF_3SO_2)_2)_2 \iff Co^{2+} + 2(N(CF_3SO_2)_2^-)$
$Li^+ + Co^{2+} + A^- \iff Li^+ + Co^{2+}A^- + e^-$ Other redox materials to be contained in the positive electrode liquid may include: powders composed simply of sulfur, selenium, or tellurium; and thiocyanates such as iron thiocyanate ($Fe(SCN)_2$) and cobalt thiocyanate ($Co(SCN)_2$). Also, transition metal salts including an anion of a currently known lithium salt may be used without any particular limitation.

The positive electrode current collector is a place where the redox material in the positive electrode liquid is oxidized or reduced and electrons are donated or accepted. Thus, a larger reaction area of the positive electrode current collector is more preferable, though it depends on the reaction speed. In order to secure a large reaction area and promote the reaction of the redox material, it is effective to form a carbon layer on the surface of the current collector comprising a metal sheet. The carbon layer is preferably formed by attaching carbon particles with a large specific surface area to the surface of the metal sheet.

It is preferred that the positive electrode current collector be as stable as possible at the potential of +3 V or higher relative to the potential of the alkali metal that forms the alkali metal salt. Specifically, the metal sheet serving as the positive electrode current collector preferably has a dissolving potential of +3 V or higher relative to the potential of the alkali metal. For example, the positive electrode current collector preferably comprises tungsten, molybdenum, aluminum that is easy to process and inexpensive, austenitic stainless steel, or titanium. Also, the positive electrode current collector may comprise a sintered metal powder with an excellent resistance to oxidation and a large specific surface area. Further, the positive electrode current collector may comprise a carbon felt or a carbon sheet made of a carbon material with a large specific surface area, such as activated carbon powder.

Also, a laminate sheet composed of a resin film and a positive electrode current collector may be used such that the current collector serves as the exterior component (e.g., outer jacket) of the battery. The exterior component may comprise glass, ceramics, plastics, polymers or the like. In this case, a lead made of the same material as that of the positive electrode current collector is attached to the positive electrode current collector. The lead needs to be pulled out from the outer jacket.

The negative electrode may comprise a material capable of absorbing and desorbing an alkali metal ion without any particular limitation. Also, the negative electrode may comprise an alkali metal itself. The negative electrode comprising an alkali metal itself dissolves to produce alkali metal ions. The alkali metal ions can be deposited on the negative electrode again.

Exemplary materials capable of absorbing and desorbing an alkali metal include carbon materials, metals and alloys, transition metal oxides, transition metal sulfides, silicon, and silicon monoxide. Exemplary carbon materials include graphite with a large capacity, amorphous carbon, fullerene, and carbon nanotube. Exemplary metals and alloys include silicon, tin, lead, aluminum, cadmium, indium, platinum, silver and bismuth. Exemplary transition metal oxides include tungsten oxide, vanadium oxide, lithium titanate, and lithium vanadate. Exemplary transition metal sulfides include molybdenum disulfide and titanium disulfide. Exemplary alkali metals used in the negative electrode include lithium metal and sodium metal. These negative electrode materials may be used in combination of two or more.

The non-aqueous solvent that forms the component (A) preferably comprises a polar solvent that is in liquid form at room temperature (e.g., 25° C.) or a molten salt that is ionized at room temperature (e.g., 25° C.). However, in the case of using a non-aqueous solvent that is composed of a mixture of two or more compounds, any mixture that is in liquid form at room temperature may be used, and the mixture may contain a compound that is in solid form at room temperature.

With respect to the polar solvent, those currently used in lithium ion secondary batteries or lithium primary batteries may be used without any particular limitation. Such examples include cyclic carbonates such as ethylene carbonate, propylene carbonate, and butylene carbonate, chain carbonates such as diethyl carbonate, dimethyl carbonate, and ethyl methyl carbonate, cyclic esters such as γ-butyrolactone and γ-valerolactone, and cyclic ethers such as tetrahydrofuran. It is also possible to use those with relatively high dielectric constants, such as glymes, lactones, and sulfolanes.

With respect to the molten salt, an ionic liquid comprising a combination of an organic cation and an organic or inorganic anion may be used. Exemplary organic cations that may be used include tetrahexyl ammonium ($THA^+$), 1-hexyl-3-methyl imidazolium ($HMI^+$), 1,2-dimethyl-3-propyl imidazolium ($DMPI^+$), 1-ethyl-3-methyl imidazolium ($EMI^+$), and 1-butyl-3-methyl imidazolium ($BMI^+$). Also, exemplary organic or inorganic anions that may be used include bistrifluoromethane sulfonyl imide anion ($TFSI^-$), hexafluorophosphate anion ($PF_6^-$), tetrafluoroborate anion ($BF_4^-$), thiocyanate anion ($SCN^-$), and tetrachloroaluminate anion ($AlCl_4^-$).

It is also possible to use a solvent mixture comprising a non-ionic organic solvent and an ionic liquid. It should be noted that there is no problem if a solid exists in the positive electrode liquid due to its solubility.

Exemplary alkali metal salts that form the component (A) include imide salts ($XN(SO_2C_nF_{2n+1})(SO_2C_mF_{2m+1})$ (X is an alkali metal, n and m are equal to or greater than 0, and n and m may be the same)), methide salts ($XC(SO_2C_kF_{2k+1})(SO_2C_mF_{2m+1})(SO_2C_nF_{2n+1})$ (X is an alkali metal, k, m, and n are equal to or greater than 1, and k, n, and m may be the same)), borates, perchlorates ($XClO_4$), hexafluoroarsenates ($XAsF_6$), chloroaluminates ($XAlCl_4$), thiocyanates ($XSCN$), iodide salts ($XI$), tetrafluoroborates ($XBF_4$), hexafluorophosphates (e.g., $LiPF_6$), salts in which at least one of the fluorine atoms of a hexafluorophosphate is replaced with —$CF_3$ or —$C_2F_5$, salts in which at least one of the fluorine atoms of a tetrafluoroborate is replaced with —$CF_3$ or —$C_2F_5$, $LiCF_3SO_3$ and derivatives thereof. The alkali metal (X) is preferably lithium, but may be sodium, potassium, or the like. Depending on the kind of the alkali metal (X), a redox material in the positive electrode liquid and an alkali metal ion-conductive separating film can be selected.

The separating film at the interface between the positive electrode liquid and the negative electrode is not particularly limited as long as it has alkali-metal-ion conductivity and low electronic conductivity.

The positive electrode liquid is in liquid or fluid form. Thus, in order to prevent the electrical contact between the negative electrode and the positive electrode active material in a reliable manner, it is effective to cover the negative electrode with a separating film that is permeable to the alkali metal ion and has the function of shielding the negative electrode from the positive electrode active material. The separating film is preferably an alkali-metal-ion conductive solid electrolyte. Examples that may be used include: solid electrolytes comprising an alkali metal phosphate or a nitrogen-containing alkali metal phosphate; solid electrolytes comprising an alkali metal phosphate and a sulfide salt (e.g., $Li_2S$—$SiS_2$); solid electrolytes comprising an alkali metal phosphate and alkali metal silicate (e.g., $Li_3PO_4$—$Li_4SiO_4$ when the alkali metal is lithium); and solid electrolytes (e.g., $Li_2S$—$B_2S_3$ and $Li_2S$—$P_2S_5$) comprising an alkali metal sulfide and another sulfide (e.g., $B_2S_3, P_2S_5$).

An alkali metal iodide forms an alkali-metal-ion conductive film made of an iodide on the negative electrode surface. Thus, an alkali metal iodide is a preferable material that provides both an alkali metal salt, which is a constituent element of the positive electrode liquid, and an alkali-metal-ion conductive separating film.

If the negative electrode volume expands and shrinks significantly, it is effective to use an alkali-metal-ion conductive polymer electrolyte instead of the positive electrode liquid. For example, it is possible to use a gel polymer electrolyte comprising a polymer material and a positive electrode liquid that is composed of a redox material, a non-aqueous solvent and an alkali metal salt. Preferable polymer materials include polymers with an ethylene oxide chain or a propylene oxide chain, polymers with a group derived from an organic solvent such as ethylene carbonate or lactone.

It is also effective for the positive electrode liquid to contain an organic substance having the function of forming a coating film on the negative electrode surface. In this case, a separating film (coating film) that is permeable to an alkali-metal ion and shields the negative electrode from positive electrode active material can be formed on the negative electrode surface. Exemplary organic substances that may be used include vinylene carbonate (VC), vinyl ethylene carbonate (VEC), phenyl ethylene carbonate (PhEC), and propanesultone (PS).

When a negative electrode lead is connected to the negative electrode for leading a current to outside, it is preferred that the negative electrode lead be also shielded from the positive electrode active material. For example, the part of the negative electrode lead that may come into contact with the positive electrode active material is covered with a separating film comprising an alkali-metal-ion conductive solid electrolyte. Alternatively, it is effective to cover the whole negative electrode lead with an insulating material such as resin.

The present invention is applicable to non-aqueous electrolyte secondary batteries of any shape, such as cylindrical type, rectangular-type, laminate sheet bag-type, and coin-type. The form of the positive and negative electrodes may be changed as appropriate, depending on the shape of the battery. In any form, if at least a part of the negative electrode and at least a part of the positive electrode current collector are immersed in the positive electrode liquid, such non-aqueous electrolyte secondary battery of the present invention can be charged and discharged.

The present invention is hereinafter described specifically by way of Examples.

Example 1

FIG. 1 is a longitudinal sectional view of a non-aqueous electrolyte secondary battery prepared in this example. This battery was produced as follows.

(i) Production of Battery Case

A bag-like case 2 was produced from a tungsten sheet serving as the positive electrode current collector and the outer jacket. A carbon layer 3 composed mainly of carbon black was formed on the inner face of the case 2. The carbon layer was bonded to the tungsten sheet by applying a mixed paste containing carbon black (CB), polyvinylidene fluoride (PVdF), and N-methyl-2-pyrrolidone (NMP) (the weight ratio CB:PVdF:NMP was 100:10:100) to one side of the tungsten sheet by screen printing and drying it at 100° C.

(ii) Preparation of Positive Electrode Liquid

A positive electrode liquid 4 was prepared by dissolving a positive electrode active material comprising a redox material in a liquid electrolyte. This liquid electrolyte was prepared by dissolving lithium bistrifluoromethane sulfonylimide (LiN$(SO_2CF_3)_2$) (alkali metal salt) at a concentration of 4 mol/liter in a non-aqueous solvent mixture of ethylene carbonate and ethyl methyl carbonate in a volume ratio of 1:1. The resultant liquid electrolyte was mixed with lithium sulfide ($Li_2S$) (redox material) at a concentration of 1 mol/liter, to prepare the positive electrode liquid 4.

(iii) Preparation of Negative Electrode

A negative electrode mixture paste was prepared by mixing 100 parts by weight of amorphous carbon (CARBOTRON P, available from Kureha Chemical Industry Co., Ltd.) (negative electrode active material) with 3 parts by weight of styrene butadiene rubber (binder) in a form of an aqueous dispersion and kneading the mixture. This negative electrode mixture paste was applied to both sides of a current collector comprising copper foil, dried and rolled to form active material layers. This produced a negative electrode 7.

Subsequently, the negative electrode 7 was cut into a predetermined shape and placed into a sputtering apparatus, where a 2 μm thick separating film 6 was formed on the surface of the negative electrode 7 by sputtering using a solid electrolyte comprising lithium phosphate ($Li_3PO_4$) as the target. The composition of the lithium phosphate of the separating film was approximately $Li_{2.9}PO_{3.3}N_{0.36}$. Thereafter, a part of the negative electrode mixture was removed from the edge of the negative electrode current collector to expose the current collector, and one end of a nickel negative electrode lead 1 was bonded to the exposed part of the current collector by resistance welding. The whole negative electrode lead excluding the other end was covered with an insulating tape 8.

(iv) Fabrication of Battery

Next, the negative electrode was inserted into the case 2, and the positive electrode liquid 4 was injected therein. At this time, the joint between the negative electrode lead at one end of the negative electrode and the negative electrode current collector was positioned over the liquid level of the positive electrode liquid. Thereafter, the other end of the negative electrode lead 1 was pulled out from the opening of the case 2, and the opening was sealed with an insulating gasket 5 made of polyphenylene sulfide.

The resultant battery was 30 mm in width, 50 mm in total height, and 5.3 mm in thickness. This battery had a design capacity of 800 mAh. It should be noted that all the batteries used in the following examples had a design capacity of 800 mAh.

This battery was charged at a constant charge current of 0.08 A at an ambient temperature of 20° C. until the battery voltage reached 5.0 V, and after an interval of 20 minutes, the battery was discharged at a discharge current of 0.08 A down to a cut-off voltage of 2.0 V. This charge/discharge cycle was performed once. The battery voltage before the discharge was 4.2 V. This battery was designated as the battery of Example 1.

Example 2

A battery was produced in the same manner as in Example 1, except for the use of lithium tetrafluoroborate ($LiBF_4$) as the alkali metal salt of the liquid electrolyte used for producing the positive electrode liquid. This battery was designated as the battery of Example 2.

Example 3

A battery was produced in the same manner as in Example 1, except for the use of lithium thiocyanate (LiSCN) as the alkali metal salt of the liquid electrolyte used for producing the positive electrode liquid. This battery was designated as the battery of Example 3.

Example 4

A battery was produced in the same manner as in Example 1, except for the use of lithium bisfluoroethyl sulfonylimide ($LiN(SO_2C_2F_5)_2$) as the alkali metal salt of the liquid electrolyte used for producing the positive electrode liquid. This battery was designated as the battery of Example 4.

Example 5

A battery was produced in the same manner as in Example 1, except for the use of a solvent mixture of propylene carbonate and dimethyl carbonate in a volume ratio of 1:3 as the non-aqueous solvent of the liquid electrolyte used for producing the positive electrode liquid. This battery was designated as the battery of Example 5.

Example 6

A battery was produced in the same manner as in Example 1, except for the use of trimethyl propyl ammonium-bistrifluoromethyl sulfonylimide (TMPA-TFSI), which is an ionic liquid (room-temperature molten salt), as the non-aqueous solvent of the liquid electrolyte used for producing the positive electrode liquid. This battery was designated as the battery of Example 6.

Example 7

A battery was produced in the same manner as in Example 1, except for the use of graphite (NG-7 available from The Kansai Coke And Chemicals Co., Ltd) as the negative electrode active material. This battery was designated as the battery of Example 7.

Example 8

A battery was produced in the same manner as in Example 1, except for the use of lithium metal as the negative electrode active material. This battery was designated as the battery of Example 8.

Example 9

A battery was produced in the same manner as in Example 1, except for the use of a 4-µm-thick silicon film formed on a copper foil current collector by vapor deposition as the negative electrode active material. This battery was designated as the battery of Example 9.

Example 10

A battery was produced in the same manner as in Example 1, except for the use of lithium titanate ($Li_4Ti_5O_{12}$) as the negative electrode active material. This battery was designated as the battery of Example 10.

Example 11

A battery was produced in the same manner as in Example 1, except for the use of silicon monoxide (SiO) (available from Sumitomo Titanium Corporation) as the negative electrode active material. This battery was designated as the battery of Example 11.

Example 12

A battery was produced in the same manner as in Example 1, except for the use of molybdenum disulfide ($MoS_2$) (available from Kojundo Chemical Lab. Co., Ltd) as the negative electrode active material. This battery was designated as the battery of Example 12.

Example 13

Lithium sulfide ($Li_2S$), silicon sulfide ($SiS_2$), and lithium phosphate ($Li_3PO_4$) were melted, mixed together and solidified, to form an amorphous material. A battery was produced in the same manner as in Example 1, except for the use of this amorphous material, instead of the lithium phosphate, for forming a separating film on the negative electrode surface by vapor deposition. This battery was designated as the battery of Example 13. The composition of the amorphous material constituting the separating film was approximately $0.63Li_2S$-$0.36SiS_2$-$0.01Li_3PO_4$ (0.63, 0.36, and 0.01 represent molar ratios).

Example 14

Dimethyl carbonate with $LiN(SO_2CF_3)_2$ dissolved therein was mixed with polyethylene oxide such that the Li/O ratio was 1/12, to prepare a lithium-ion-conductive polymer electrolyte. The negative electrode surface was coated with this polymer electrolyte, and the coating film was three-dimensionally cross-linked by ultraviolet irradiation, to form a separating film. A battery was produced in the same manner as Example 1 except for the use of this separating film. This battery was designated as the battery of Example 14.

Example 15

A battery was produced in the same manner as in Example 1 except for the addition of 5% by weight of vinylene carbonate to the positive electrode liquid. The battery was charged at 80 mA for 2 hours and discharged at 80 mA until the battery voltage became 2 V. This battery was designated as the battery of Example 15.

Example 16

A battery was produced in the same manner as in Example 1 except for the use of iron tetrafluoroborate ($Fe(BF_4)_2$) as the redox material (positive electrode active material) of the positive electrode liquid. This battery was designated as the battery of Example 16.

Example 17

A battery was produced in the same manner as in Example 1 except for the use of lithium selenide ($Li_2Se$) as the redox material of the positive electrode liquid. This battery was designated as the battery of Example 17.

Example 18

A battery was produced in the same manner as in Example 1 except for the use of lithium telluride ($Li_2Te$) as the redox material of the positive electrode liquid. This battery was designated as the battery of Example 18.

Example 19

A battery was produced in the same manner as in Example 1 except that the negative electrode covered with the separating film was further covered with a polyethylene micro-porous film (available from Tonen Corporation). This battery was designated as the battery of Example 19.

Example 20

A battery was produced in the same manner as in Example 1 except for the use of an iron sheet as the outer jacket serving as a current collector. This battery was designated as the battery of Example 20.

Comparative Example 1

A battery was produced in the same manner as in Example 1 except that the alkali-metal-ion conductive separating film was not formed on the negative electrode surface and that the negative electrode was covered with the polyethylene micro-porous film used in Example 19. This battery was designated as the battery of Comparative Example 1.

[Evaluation]

Tests of the batteries were conducted as follows.

Each battery was charged at a constant charge current of 0.08 A at an ambient temperature of 20° C. until the battery voltage reached 5 V, and after an interval of 20 minutes, the battery was discharged at a discharge current of 0.08 A down to a cut-off voltage of 2.0 V, except the batteries of Example 9, 10, 11, 12 and 16. The charging/discharging voltage of the battery of 9, 10, 11, 12 and 16 are 4.5V/1.5V, 3.5V/0.5V, 4.5V/1.5V, 3.7V/0.7V and 4.2V/2.0V respectively. This charge/discharge cycle was repeated 10 times. The discharge capacity at the 10th cycle was defined as battery capacity. Table 1 shows the capacities of the batteries.

TABLE 1

| Example | Battery capacity (mAh) |
|---|---|
| 1 | 780 |
| 2 | 790 |
| 3 | 780 |
| 4 | 780 |
| 5 | 780 |
| 6 | 800 |
| 7 | 810 |
| 8 | 830 |
| 9 | 750 |
| 10 | 760 |
| 11 | 730 |
| 12 | 760 |
| 13 | 780 |
| 14 | 790 |
| 15 | 740 |
| 16 | 320 |
| 17 | 780 |
| 18 | 780 |
| 19 | 780 |
| 20 | 410 |
| Comparative example 1 | 50 |

The results of Table 1 show that the batteries of Examples 1 to 15 and Examples 17 to 19 had capacities close to the design capacity. This indicates that the valence of sulfur changed from −2 to +4 in an electrochemical reaction represented by the reaction formula (1) or (2) or a similar reaction. Also, the results of Examples 17 and 18 show that lithium selenide ($Li_2Se$) and lithium telluride ($Li_2Te$), which are lithium chalcogenides, also reacted in the same manner as the lithium sulfide ($Li_2S$) in Examples 1 to 15 as the redox material of the positive electrode liquid.

On the other hand, in Example 16 using iron tetrafluoroborate ($Fe(BF_4)_2$), the battery capacity was less than half that of lithium sulfide. The reason is probably that although the valence of sulfur of lithium sulfide changes by 6, the oxidation number of iron of $Fe(BF_4)_2$ changes only from Fe(II) to Fe(III), or Fe(IV) at largest. It should be noted, however, that even the capacity density of the battery of Example 16 may be higher than that of already commercialized non-aqueous electrolyte secondary batteries.

The results of Examples 2 to 4 indicate that the kind of the lithium salt of the liquid electrolyte hardly affects battery capacity. This is probably because the reaction utilization rate (yield) of the redox material is low and the lithium salt is therefore ionized to such a degree that the amount of anion produced thereby is sufficient for the amount of highly oxidized cation.

In Examples 7 to 12 using various negative electrode active materials, the resultant capacities were varied. This is probably due to the irreversible capacity inherent in each material. For example, in the case of the graphite used in Example 7, its irreversible capacity is approximately one-third that of the amorphous carbon used in Example 1 per unit weight. This is probably the reason why the capacity in Example 7 using the graphite was higher, though slightly. For the similar reason, the use of lithium metal as the negative electrode active material results in a higher capacity.

Silicon of Example 9 and silicon monoxide of Example 11, for example, are known as materials highly capable of absorbing and desorbing lithium, but they were not designed so as to fully utilize their capacities in those examples. Since their irreversible capacities are larger than those of carbon and graphite, their battery capacities were lower.

In Example 10 using lithium titanate ($Li_4Ti_5O_{12}$) and Example 12 using molybdenum disulfide ($MoS_2$) as the negative electrode active material, their battery voltages were lower than those of Examples 1, 7 and 8 using amorphous carbon, graphite, and lithium metal, respectively. This is probably because the potential of lithium titanate or molybdenum disulfide, which causes a lithium elimination reaction in the negative electrode, is 1.5 V or higher on average relative to the potential of lithium metal. However, since oxides such as lithium titanate and silicon monoxide and sulfides such as molybdenum disulfide are known to provide good cycle life, they can be expected to provide sufficient performance as the negative electrode in applications where relatively low potentials are permissible.

The results of Example 1 using the solvent mixture of ethylene carbonate and ethyl methyl carbonate, Example 5 using the solvent mixture of propylene carbonate and dimethyl carbonate, and Example 6 using trimethyl propyl ammonium-bistrifluoromethyl sulfonylimide (TMPA-TFSI, a kind of ionic liquid (room-temperature molten salt)) indicate that the non-aqueous solvent of the positive electrode liquid does not significantly affect battery performance and a sufficient battery capacity can be obtained without being affected by the kind of the non-aqueous solvent. Also, since ionic liquids have a high tendency to ionize, the use of an ionic liquid is thought to provide higher performance than the use of a common polar non-aqueous solvent.

Examples 1 to 20 showed that the alkali-metal-ion conductive separating film covering the negative electrode surface had sufficient ionic conductivity and effectively prevented a short-circuit between the redox material of the positive electrode liquid and the negative electrode. Also, Example 14 indicated that the polymer electrolyte was also effective as the separating film.

In Example 15 including vinylene carbonate in the positive electrode liquid, it was confirmed that the negative electrode surface was covered with a coating film due to the decomposition of the vinylene carbonate on the negative electrode surface during the charge of the battery. However, the capacity was low probably because the coating film derived from vinylene carbonate contained slight sulfur.

In Example 19 using both alkali-metal-ion conductive separating film and polyethylene micro-porous film separator, the battery capacity was the same as that of Example 1. However, in the event of, for example, an impact given to the battery, the separator is thought to perform the function of reinforcing the thin alkali-metal-ion conductive separating film.

In Comparative Example 1 having no alkali-metal-ion conductive separating film, the battery voltage did not rise in an early stage of charge and the capacity was very small at the 10th cycle. This is probably because the sulfur with a valence of −2, which is the redox material in the positive electrode liquid, is oxidized during the charge, but it migrates to the negative electrode surface where it is reduced.

As described above, the present invention is applicable to a non-aqueous electrolyte secondary battery that is inexpensive and has a high energy density, and the present invention has versatility such that the battery voltage can be designed according to the application.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   (A) a liquid electrolyte comprising a non-aqueous solvent and an alkali metal salt dissolved in said non-aqueous solvent;
   (B) a positive electrode active material comprising a redox material that is dissolved or dispersed in said liquid electrolyte;
   (C) a positive electrode current collector that provides a place where an oxidation-reduction reaction involving said positive electrode active material occurs; and
   (D) a negative electrode capable of charging and discharging in which an alkali metal ion participates,
   wherein said negative electrode is covered with a separating film, and said separating film has alkali-metal-ion conductivity and shields the negative electrode from said positive electrode active material, whereby said negative electrode is electronically insulated from said positive electrode active material, and
   said separating film comprises an alkali-metal-ion conductive solid electrolyte.

2. The non-aqueous electrolyte secondary battery in accordance with claim 1, wherein said separating film is permeable only to the alkali metal ion.

3. The non-aqueous electrolyte secondary battery in accordance with claim 1, wherein said liquid electrolyte and said positive electrode active material form a liquid or fluid composite or mixture.

4. The non-aqueous electrolyte secondary battery in accordance with claim 1, wherein a part of said positive electrode active material is integrated with said current collector.

5. The non-aqueous electrolyte secondary battery in accordance with claim 1, wherein said positive electrode current collector comprises a metal sheet or a porous carbon sheet, and said metal sheet has a dissolving potential of +3 V or higher relative to a potential of an alkali metal that forms said alkali metal salt.

6. The non-aqueous electrolyte secondary battery in accordance with claim 5, wherein said positive electrode current collector comprises said metal sheet, and said metal sheet has a carbon layer attached to a surface thereof.

7. The non-aqueous electrolyte secondary battery in accordance with claim 1, further comprising a negative electrode lead that is connected to said negative electrode for leading a current to outside, said negative electrode lead being shielded from said positive electrode active material.

8. The non-aqueous electrolyte secondary battery in accordance with claim 1, wherein a part or the whole of said positive electrode active material is dissolved in said non-aqueous solvent, and said positive electrode active material comprises at least one redox material selected from the group consisting of a transition metal salt, a sulfur compound, a selenium compound, a tellurium compound, sulfur, selenium, and tellurium.

9. The non-aqueous electrolyte secondary battery in accordance with claim 1, wherein said negative electrode comprises at least one selected from the group consisting of an alkali metal, graphite, amorphous carbon, fullerene, carbon nanotube, an alloy, a transition metal oxide, a transition metal sulfide, silicon, and silicon monoxide.

10. The non-aqueous electrolyte secondary battery in accordance with claim 1, wherein said alkali metal salt is at least one selected from the group consisting of an imide salt, a methide salt, a borate, a perchlorate, a hexafluoroarsenate, a chloroaluminate, a thiocyanate, an iodide salt, a tetrafluoroborate, a hexafluorophosphate, a modified hexafluorophosphate, and a modified tetrafluoroborate, and said modified hexafluorophosphate is a salt in which at least one of the fluorine atoms bonded to a phosphorus atom is replaced with —$CF_3$ or —$C_2F_5$, and said modified tetrafluoroborate is a salt in which at least one of the fluorine atoms bonded to a boron atom is replaced with —$CF_3$ or —$C_2F_5$.

11. The non-aqueous electrolyte secondary battery in accordance with claim 1, wherein said non-aqueous solvent comprises at least one selected from the group consisting of a polar solvent that is in liquid form at room temperature and a molten salt that is ionized at room temperature.

12. The non-aqueous electrolyte secondary battery in accordance with claim 1, wherein said alkali-metal-ion conductive solid electrolyte comprises an alkali metal phosphate.

13. The non-aqueous electrolyte secondary battery in accordance with claim 12, wherein said alkali-metal-ion conductive solid electrolyte further comprises a sulfide salt.

14. The non-aqueous electrolyte secondary battery in accordance with claim 1, wherein said liquid electrolyte further comprises an organic substance, and said organic substance has the function of forming a coating film on the surface of said negative electrode upon charge or discharge.

15. The non-aqueous electrolyte secondary battery in accordance with claim 14, wherein said organic substance comprises at least one selected from the group consisting of vinylene carbonate, vinyl ethylene carbonate, phenyl ethylene carbonate, and propanesultone.

16. The non-aqueous electrolyte secondary battery in accordance with claim 1, wherein said liquid electrolyte further comprises an organic substance, said organic substance having the function of forming a coating film on the surface of said negative electrode upon charge or discharge, and said separating film comprises said coating film.

* * * * *